(12) United States Patent
Koskela

(10) Patent No.: US 8,661,959 B2
(45) Date of Patent: Mar. 4, 2014

(54) BULLET-ORIENTING SYSTEM

(76) Inventor: Richard Koskela, Scottsdale, AZ (US)

( * ) Notice: Subject to any disclaimer, the term of this patent is extended or adjusted under 35 U.S.C. 154(b) by 0 days.

(21) Appl. No.: 13/303,444

(22) Filed: Nov. 23, 2011

(65) Prior Publication Data

US 2013/0125737 A1 May 23, 2013

(51) Int. Cl.
*F42B 33/00* (2006.01)
(52) U.S. Cl.
USPC .................................. 86/45; 86/23
(58) Field of Classification Search
USPC ...................... 86/45, 46, 43, 24, 23
See application file for complete search history.

(56) References Cited

U.S. PATENT DOCUMENTS

| | | | |
|---|---|---|---|
| 2,387,672 A * | 10/1945 | Mayherry | 86/23 |
| 2,413,047 A * | 12/1946 | Huddleson et al. | 86/23 |
| 2,824,484 A | 2/1958 | Thompson | |
| 3,602,084 A | 8/1971 | Corcoran | |
| 3,635,325 A | 1/1972 | Sterling | |
| 4,312,438 A | 1/1982 | Valsvog | |
| 4,475,435 A | 10/1984 | Mantel | |
| 4,573,392 A | 3/1986 | Mantel | |
| 5,179,243 A | 1/1993 | Schroeder | |
| 7,497,155 B2 | 3/2009 | Koskela | |
| 7,549,364 B2 | 6/2009 | Koskela | |
| 7,552,668 B1 * | 6/2009 | Gonzalez | 86/45 |
| 2002/0121184 A1 | 9/2002 | Fowler | |

* cited by examiner

*Primary Examiner* — James Bergin
(74) *Attorney, Agent, or Firm* — Whitley Legal Group, P.C.; AnnMarie W. Whitley

(57) ABSTRACT

A bullet-orienting system applies bullets to a feed tube from a source of bullets. The bullets each have a tip-end and a base-end. The bullet-orienting system includes a bullet conveyance that conveys bullets, in tip-end-down and tip-end-up orientations, from a source of bullets to a feed tube along a bullet conveyance path. A bullet-orienting structure comprising a block, a nose guide forming a ledge, a groove, and a tapered opening, and a ramp is disposed proximate the bullet conveyance path. For each tip-end-up oriented bullet, the bullet-orienting structure interacts with the tip-end-up bullet and flips the tip-end-up bullet relative to the bullet conveyance from the tip-end-up orientation to the tip-end-down orientation prior to application to the feed tube.

18 Claims, 22 Drawing Sheets

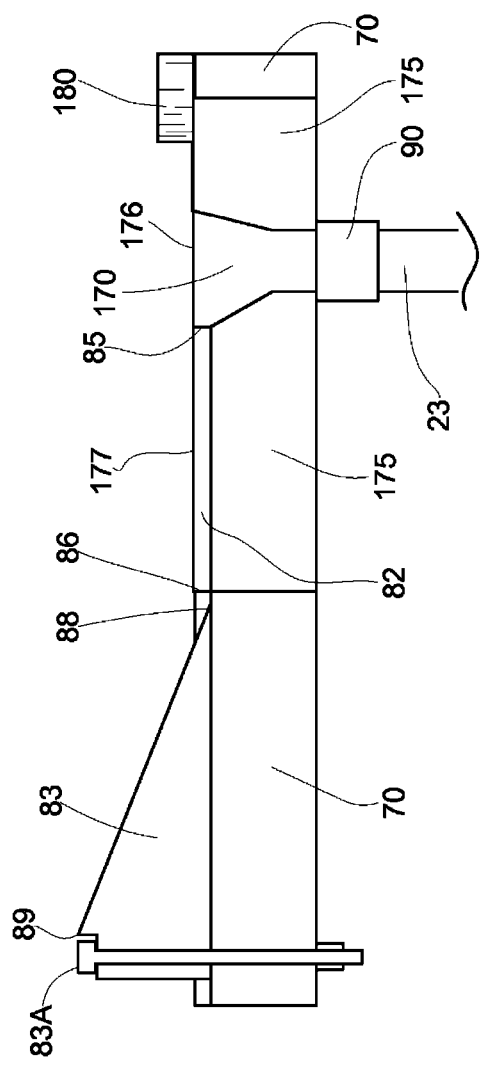

BULLET-ORIENTING SYSTEM

FIELD OF THE INVENTION

The present invention relates to apparatus and methods for fabricating ammunition and, more particularly, to apparatus and methods for loading a structure with a bullet oriented with its tip-end facing down.

BACKGROUND OF THE INVENTION

Ammunition consists of the projectiles and propelling charges used in small arms, artillery, and other guns. Ammunition size is usually expressed in terms of caliber, which is the diameter of the projectile as measured in millimeters or inches. In general, projectiles less than 20 mm or 0.60 inch in diameter are classified as small-arm, and larger calibers are considered artillery. A complete round of ammunition, which is referred to as a fixed type round, consists of all the components necessary for one firing of the gun. These normally included a projectile, the propellant, and a primer that ignites the propellant. Other components such as the cartridge case, fuze, bursting charge, and lubricant are frequently included.

Modern small-arms ammunition is nearly always of the fixed type. Complete rounds are usually called cartridges, and projectiles are called bullets. Cartridge cases or shells are most commonly made of brass, although steel is also widely used. Many varieties of bullets are cast from lead and can have lubricant or grease grooves formed on the bullet outer surface.

Handloading is the process used to create firearm cartridges by hand versus those put together en masse and sold commercially, generally in packages of 6 to 50. When previously-fired cases or shells are used, the process is often called reloading. Specific details of handloading and reloading can be found in U.S. Pat. Nos. 7,497,155 and 7,549,364, both issued to Richard Koskela, the disclosures of which are incorporated herein by reference.

After casting bullets from lead, it can be desirable to apply lubricant to any lubricant or grease grooves formed on the bullets' outer surfaces. Lubricant is applied to the bullet so that when a bullet is fired, the lubricant is transferred along the passage of the bullet down a rifled bore. Generally, lubricant is transferred from the bullet grease groove to the bore surface through compression, linear acceleration, and radial acceleration when the bullet is fired. Additionally, lubricant is injected forward during the firing process due to high-pressure gas leakage into the lubrication groove.

Some methods and apparatuses useful for applying lubricant require a bullet to be oriented with its tip-end facing down. Additionally, other bullet or projectile systems also may require a tip-end-down oriented bullet. Acceptable means for dispensing tip-end-down oriented bullets are not found in the prior art. The prior art includes inefficient devices that simply reject improperly oriented bullets rather than reorient them and devices that are simply to large or expensive for smaller applications. Unfortunately, while skilled artisans have devoted considerable effort toward the development and improvement of bullet-orienting systems, current efforts have not yielded entirely acceptable results. Given the deficiencies prevalent in the art, the need for continued improvement is evident.

SUMMARY OF THE INVENTION

A bullet-orienting system applies bullets to a feed tube from a source of bullets. The bullets each have a tip-end and a base-end. The bullet-orienting system includes a bullet conveyance that conveys bullets, in tip-end-down and tip-end-up positions or orientations, from a source of bullets to the feed tube along a bullet conveyance path. A bullet-orienting structure comprising a ramp, a block, and a nose guide forming a ledge, a groove, and a tapered opening is disposed proximate the bullet conveyance path. For each tip-end-up oriented bullet, the bullet-orienting structure interacts with the tip-end-up bullet and flips the tip-end-up bullet relative to the bullet conveyance from the tip-end-up orientation to the tip-end-down orientation prior to application to the feed tube. In particular, the tip-end-up oriented bullet passes partially across the nose-guide on a ledge which prevents it from dropping into the tapered opening. Conversely, a tip-end-down oriented bullet would slip or fall off the ledge and into the tapered opening. For the tip-end-up oriented bullet, after it rides across the ledge, it drops into the groove and is directed toward the ramp. The tip-end-up oriented bullet then interacts with the ramp and is flipped from a tip-end-up oriented bullet to a tip-end-down oriented bullet. The resultant flipped bullet is conveyed back to the nose guide where it can fall into the tapered opening.

Consistent with the foregoing summary of preferred embodiments, and the ensuing detailed description, which are to be taken together, the invention also contemplates associated apparatus and method embodiments.

BRIEF DESCRIPTION OF THE DRAWINGS

FIG. 4B is a cut-away view of the embodiment shown in FIG. 4A, cut along the dotted line A-A.

DETAILED DESCRIPTION OF PREFERRED EMBODIMENTS

Figure 1:
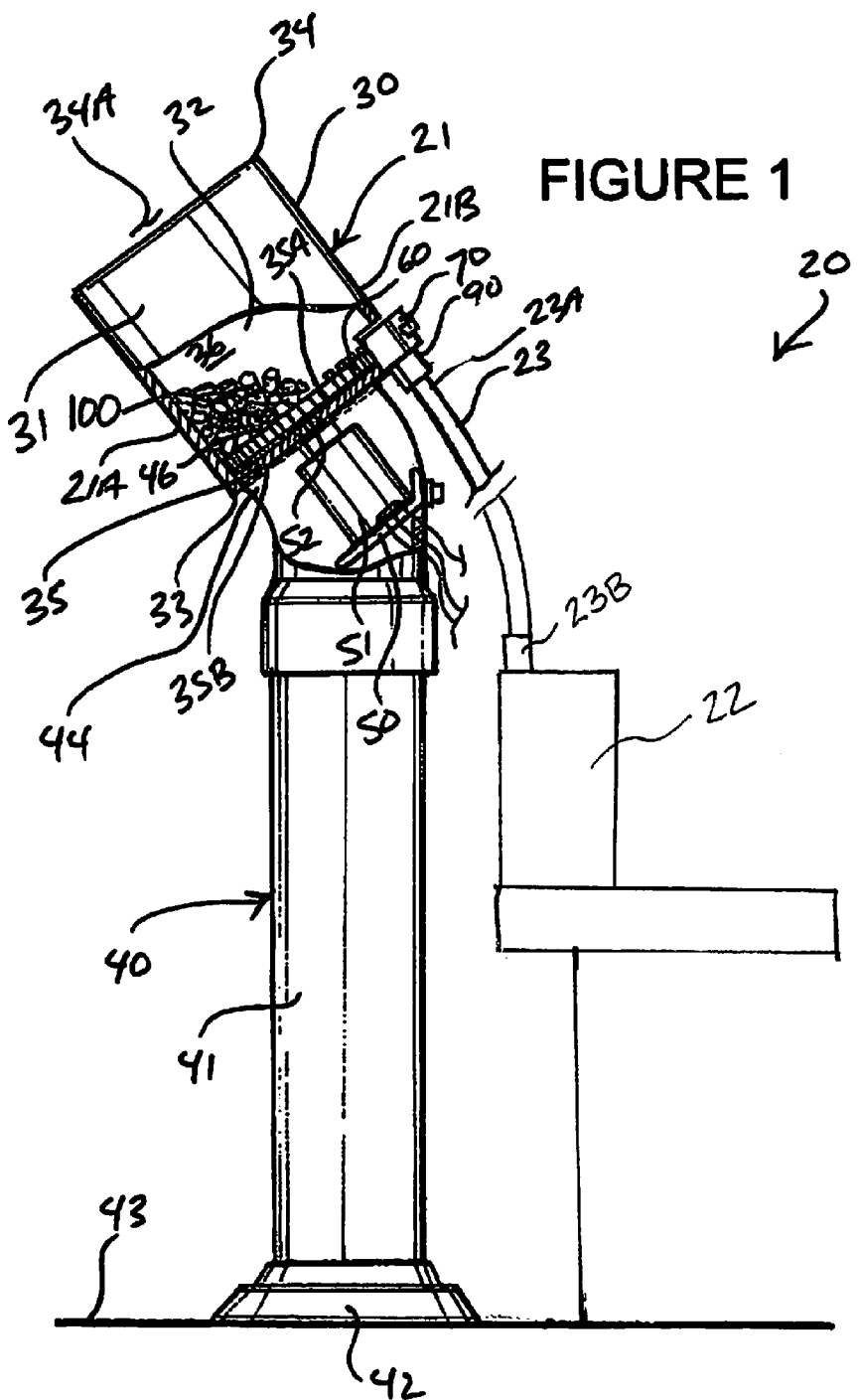
FIG. 1 is a side elevation view of an embodiment of the bullet dispensing system of the present invention with a rotary hopper, wherein portions of the rotary hopper are broken away for illustrative purposes.

Turning now to the drawings, in which like reference characters indicate corresponding elements throughout the several views, attention is first directed to FIG. 1 illustrating a bullet dispensing system 20 including a rotary hopper 21 coupled with an exit tube 23, which is also coupled to a bullet receiving apparatus 22. Exit tube 23 has an upper end 23A coupled to hopper 21, and a lower end 23B for coupling with any apparatus requiring tip-end-down oriented bullets. Hopper 21 applies bullets into exit tube 23 at upper end 23A, and exit tube 23, in turn, applies bullets at lower end 23B to a bullet receiving apparatus 22 such as a lubricant application apparatus. Hopper 21 is generally elevated relative to bullet receiving apparatus 22, whereby bullets applied to exit tube 23 by hopper 21 from a source of bullets are gravity fed through exit tube 23 to bullet receiving apparatus 22.

Figure 2:
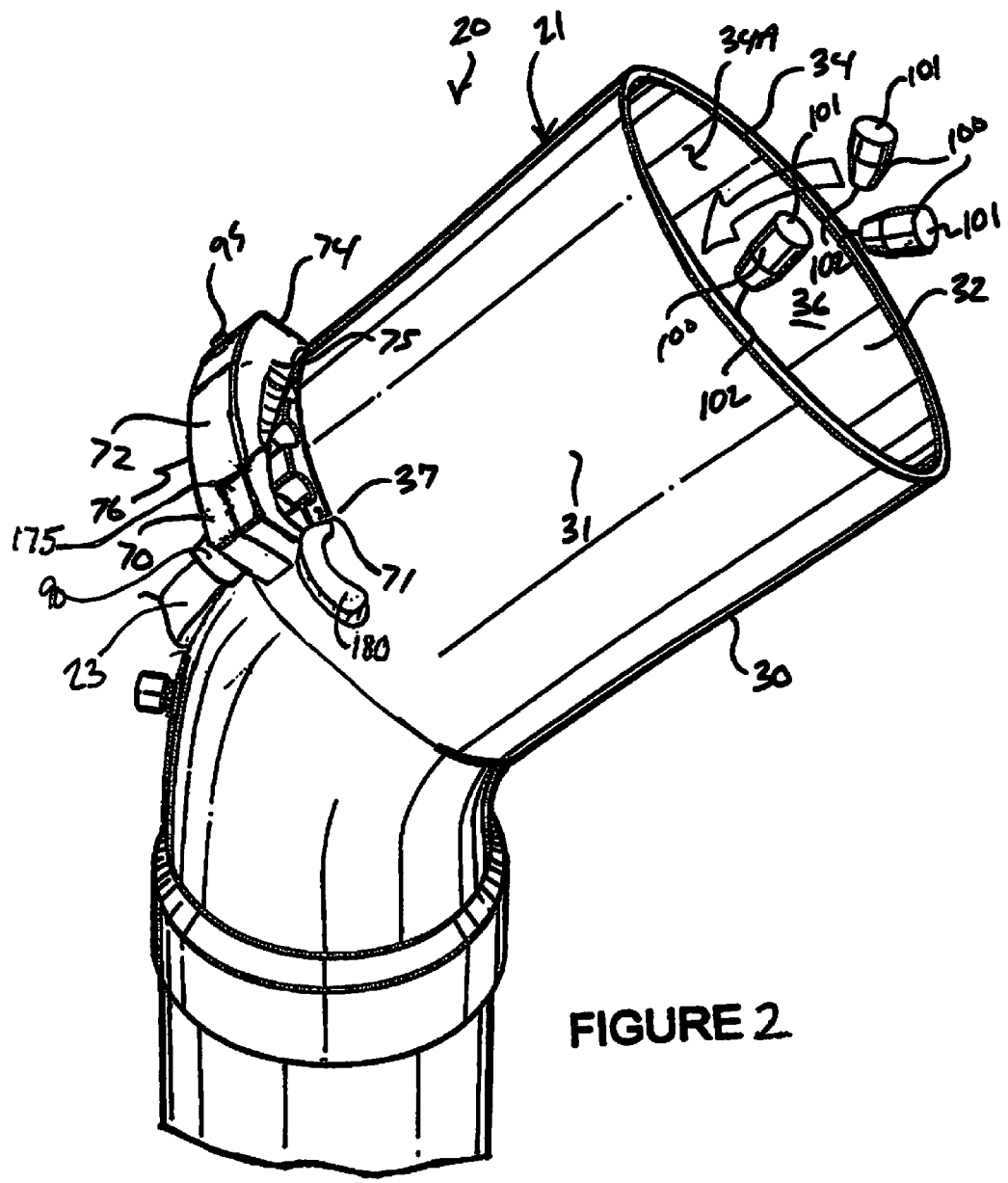
FIG. 2 is an enlarged fragmented perspective view of the rotary hopper of the bullet dispensing system of FIG. 1.
Figure 4A:
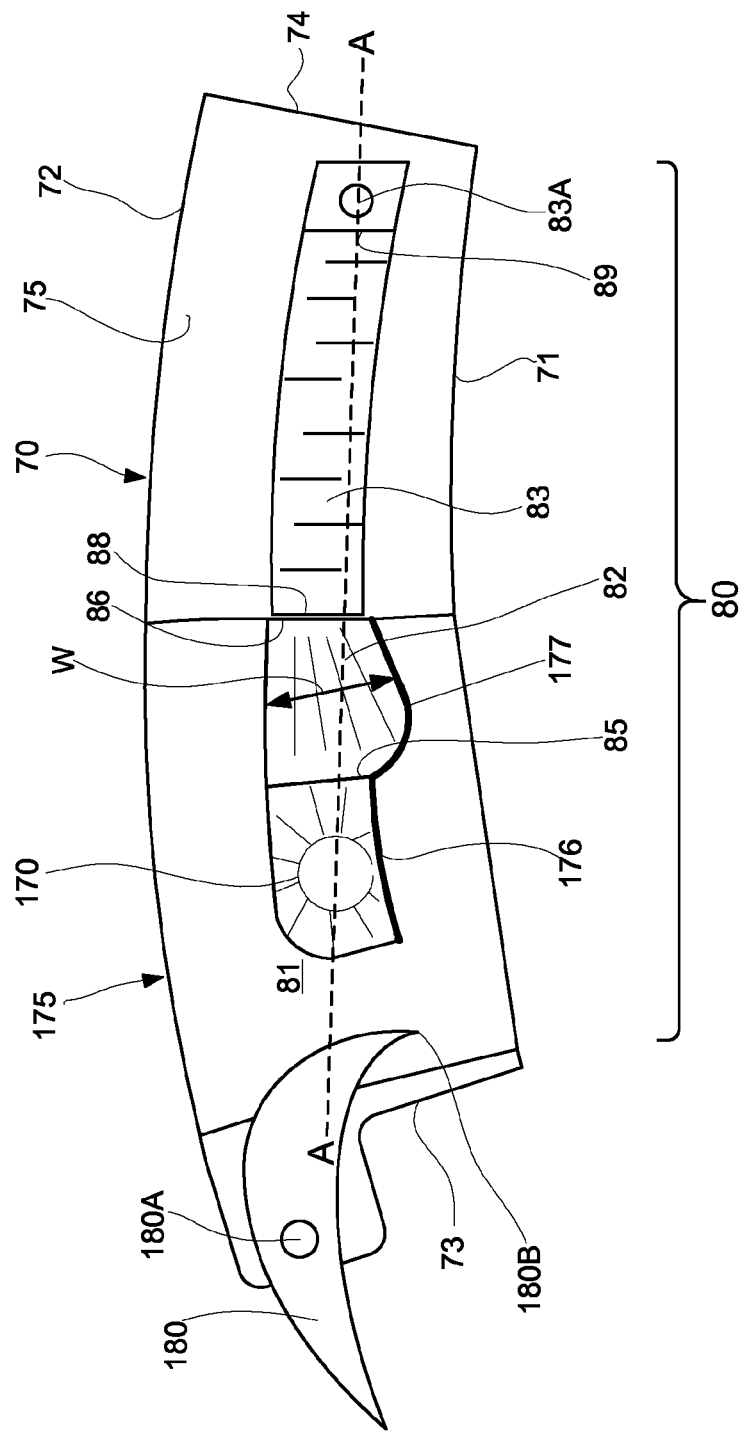
FIG. 4A is a fragmented top plan view of the preferred embodiment of the components of the block and bullet-orienting structure of the present invention.
Figure 5:
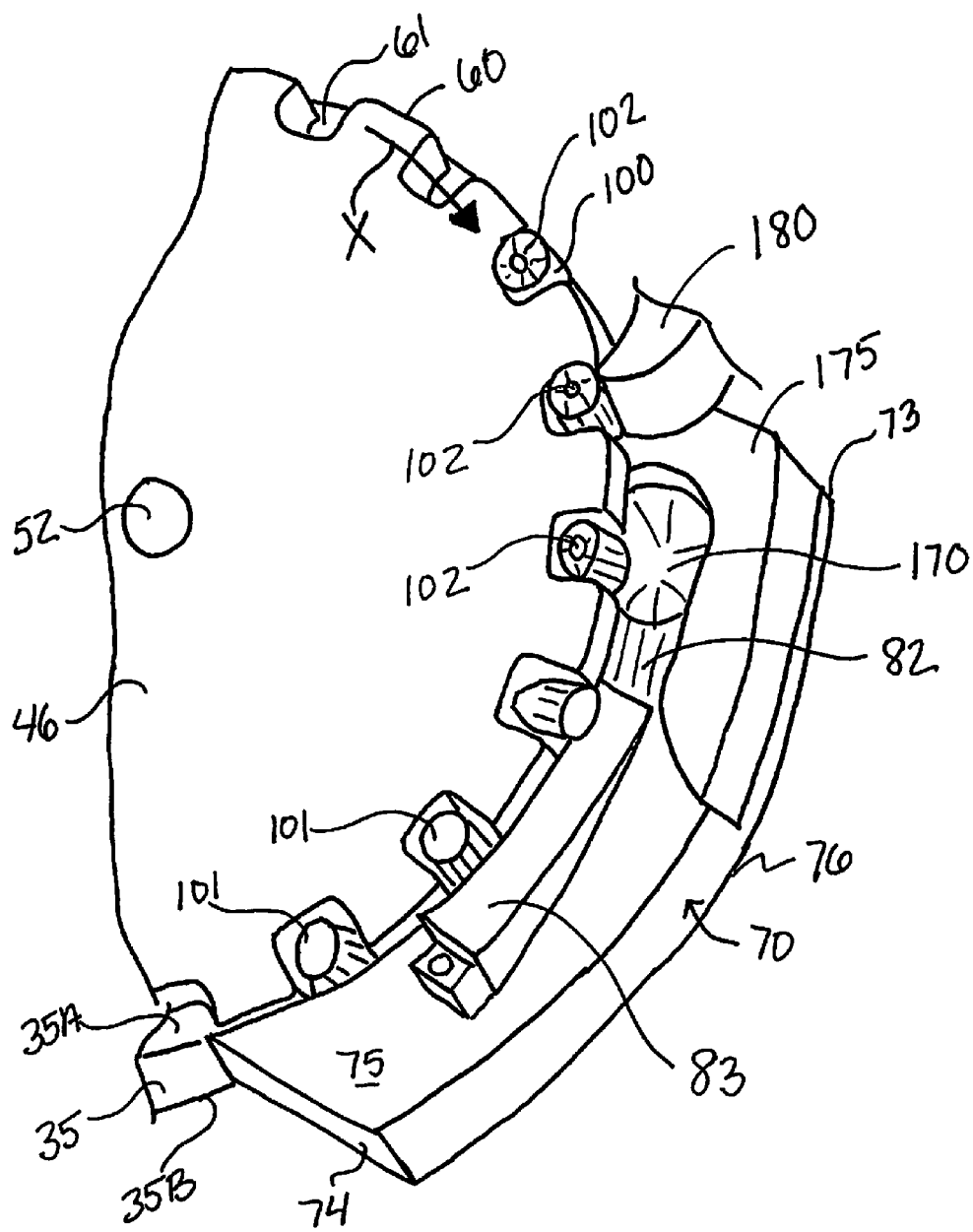
FIG. 5 is a perspective view of the block and bullet-orienting structure of the bullet dispensing system as it interacts with the wheel and a tip-end-up oriented bullet.
Figure 6:
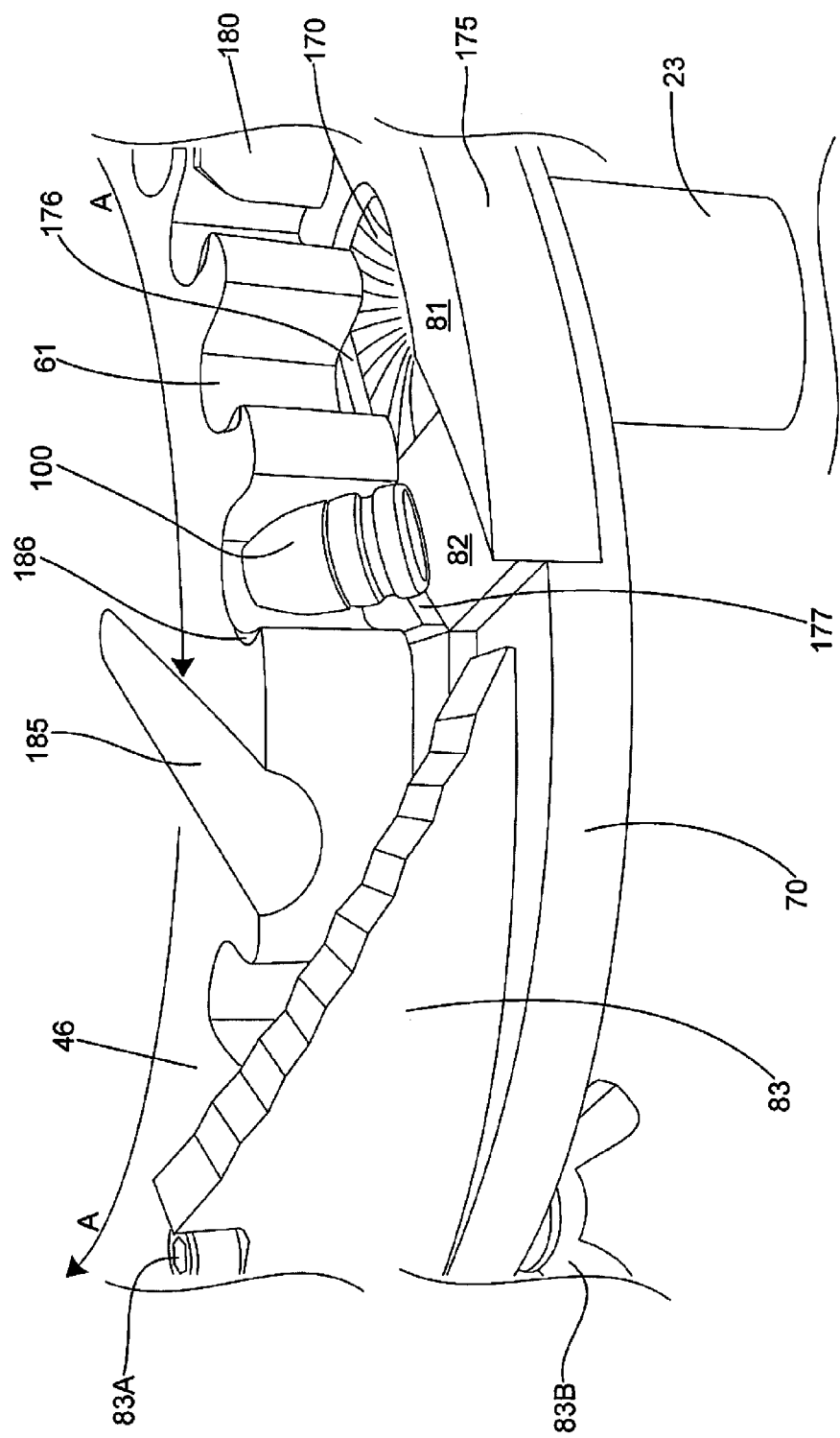
FIG. 6 is a fragmented side perspective view of the block and bullet-orienting structure of the preferred embodiment of the present invention.
Figure 7A:
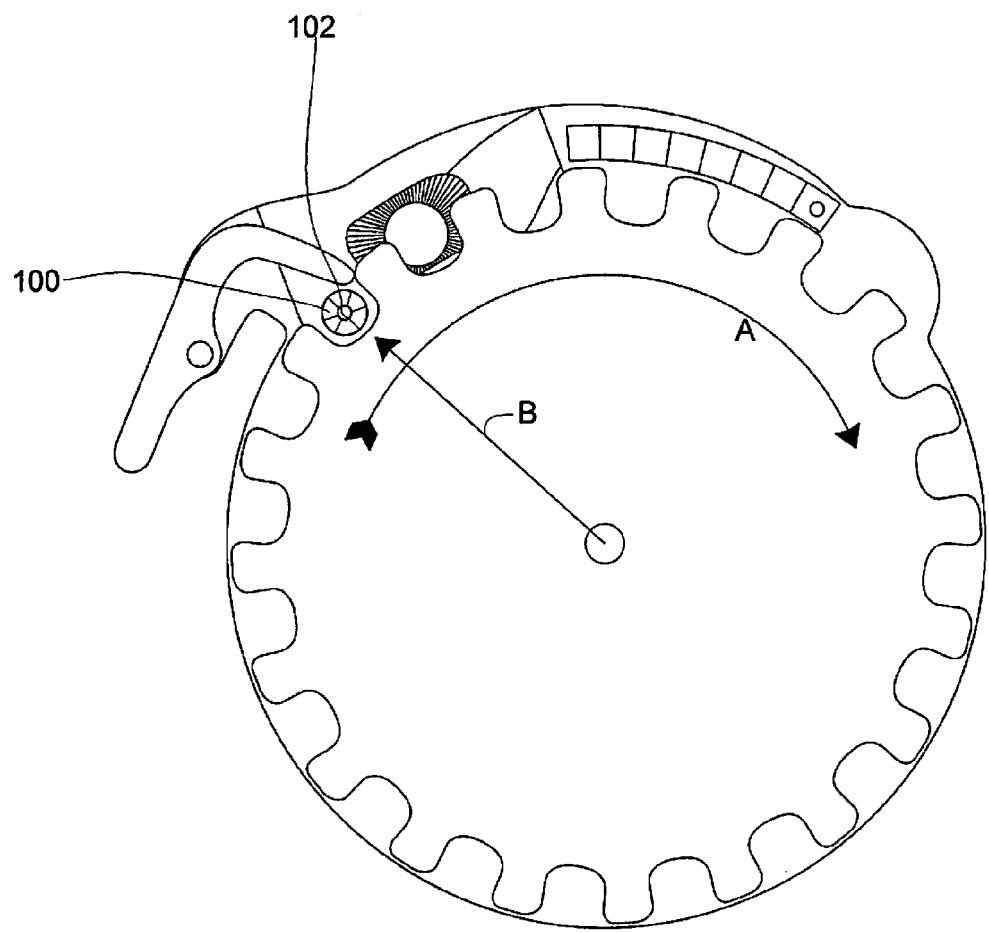
FIGS. 7A-7I and 8A-8D are sequential top plan views of the rotary wheel, block, and bullet-orienting structure of the preferred embodiment illustrating a bullet interacting with the bullet-orienting structure.
Figure 7B:
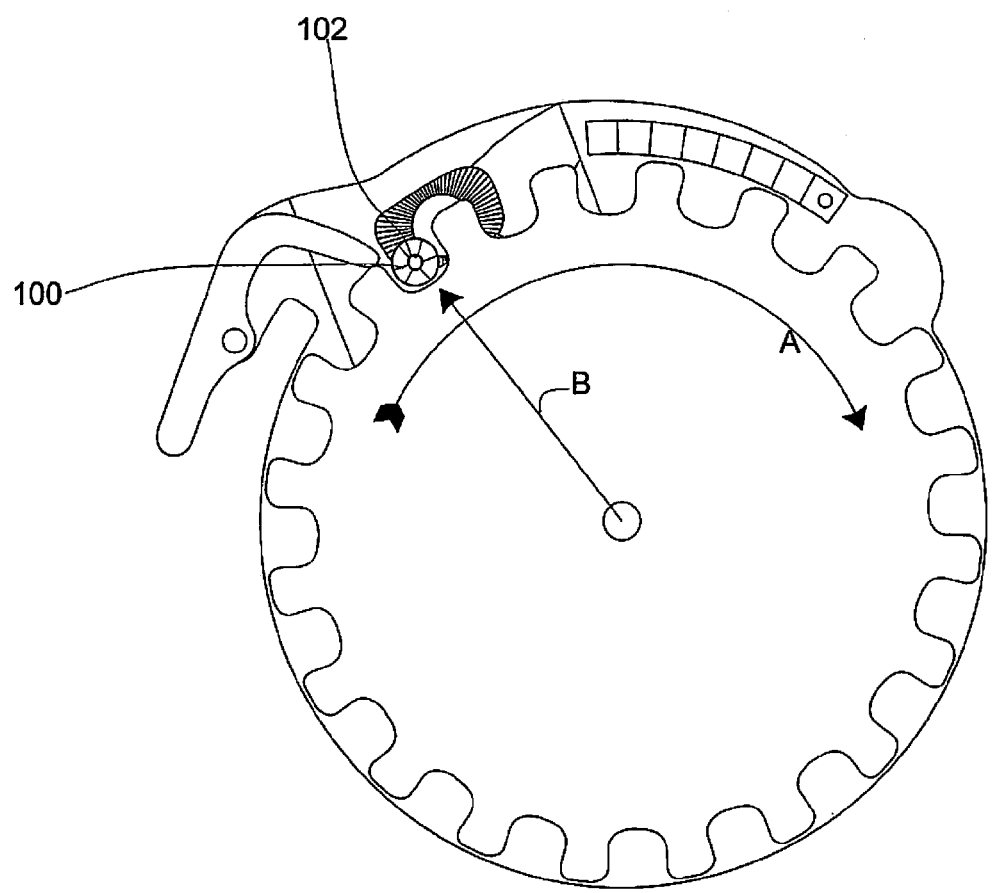
Figure 7C:
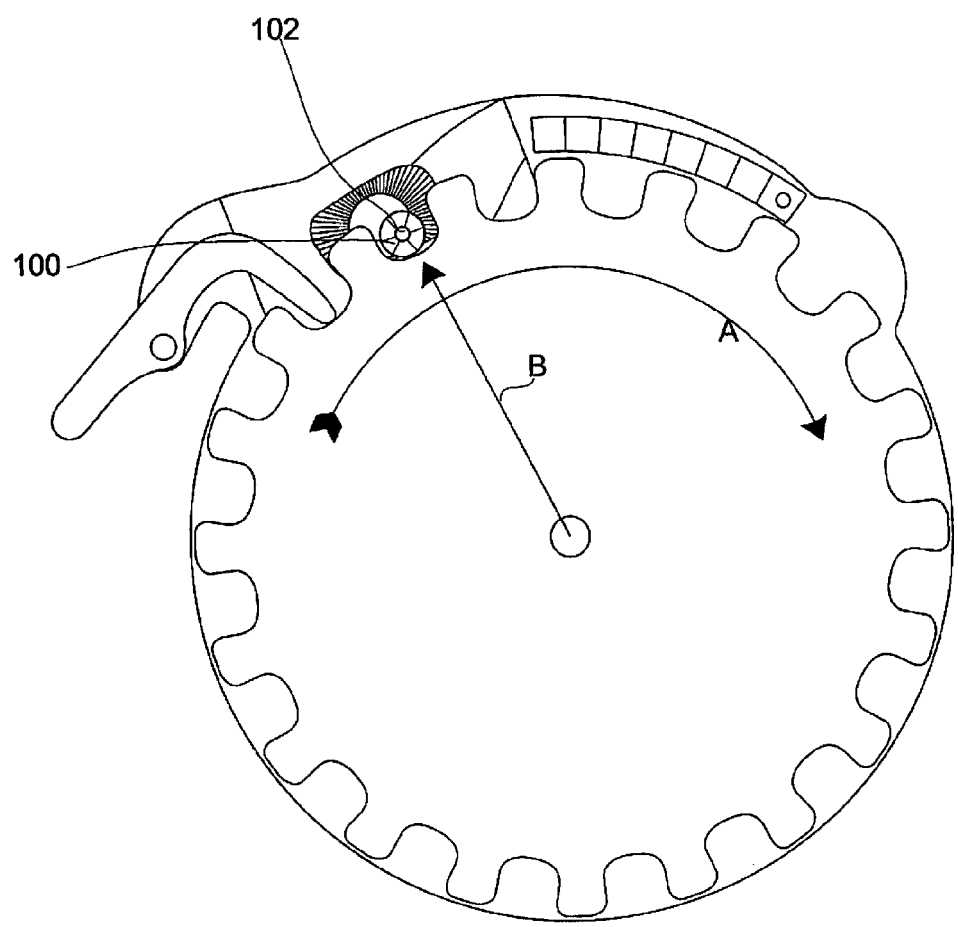
Figure 7D:
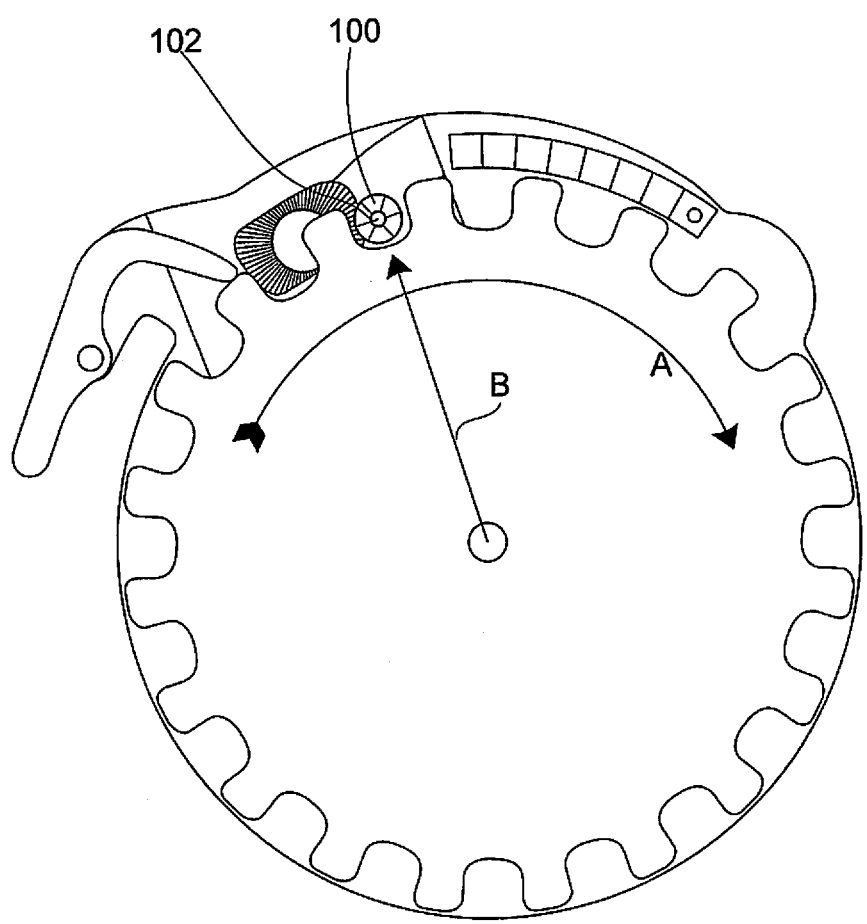
Figure 7E:
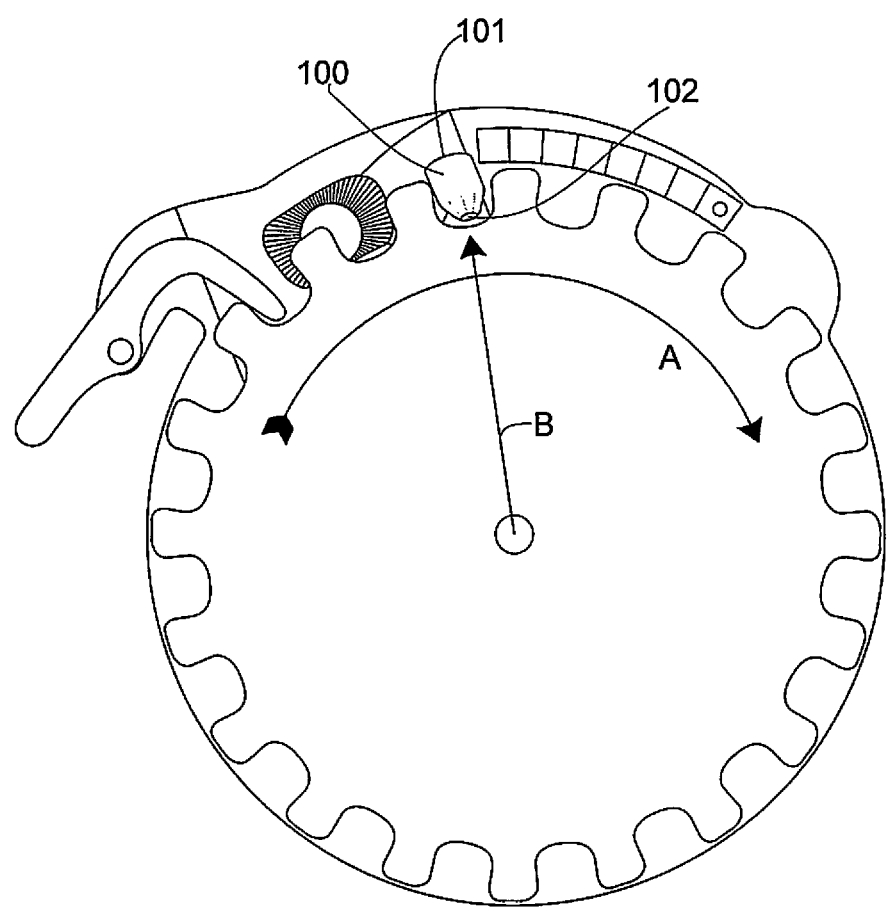
Figure 7F:
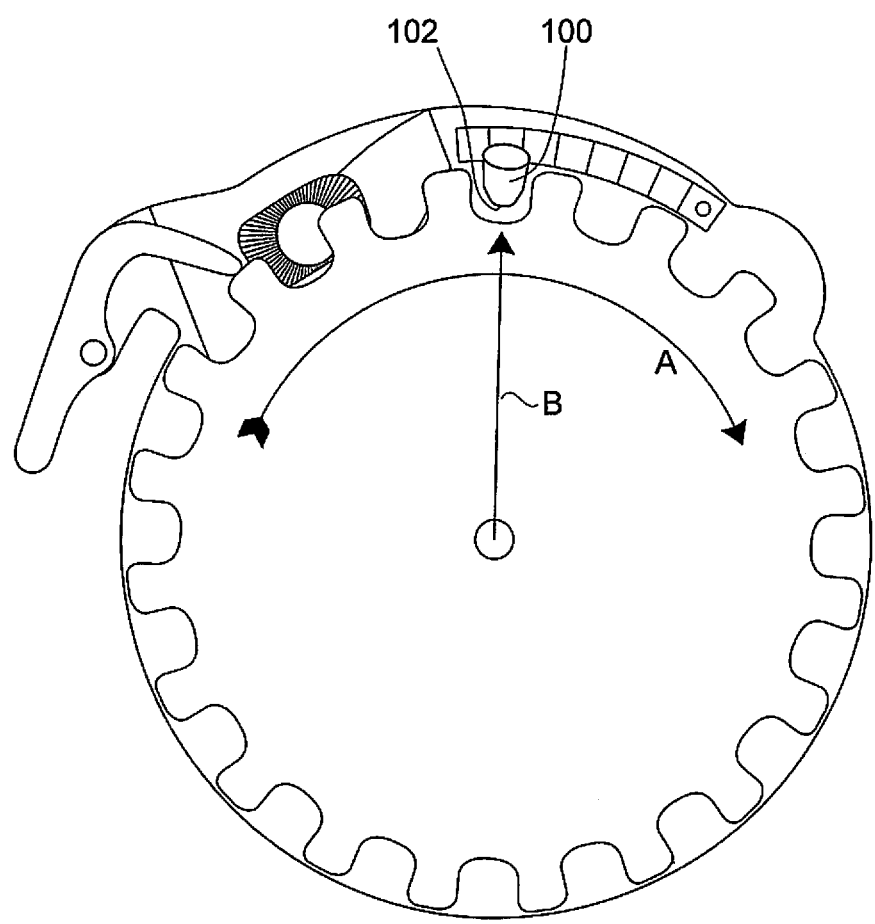
Figure 7G:
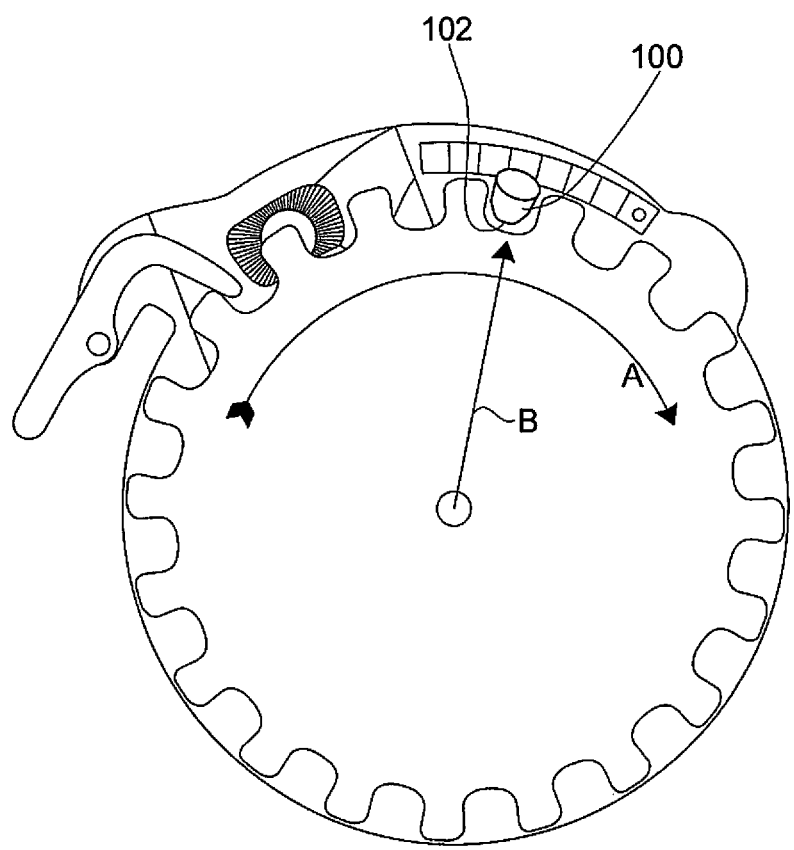
Figure 7H:
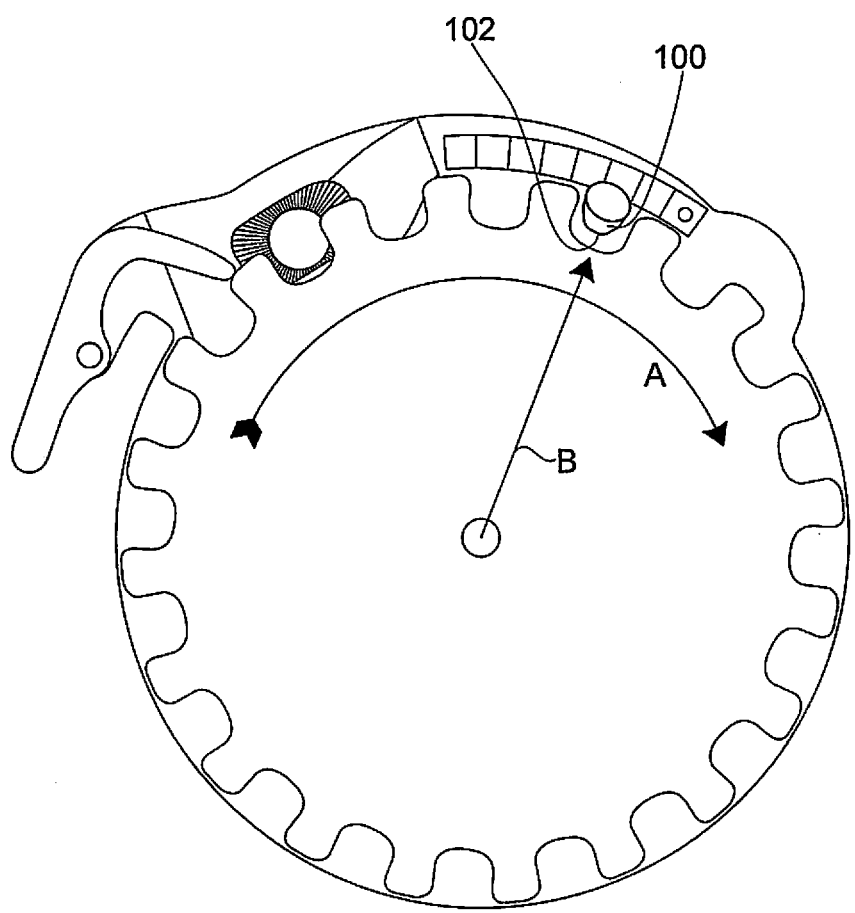
Figure 7I:
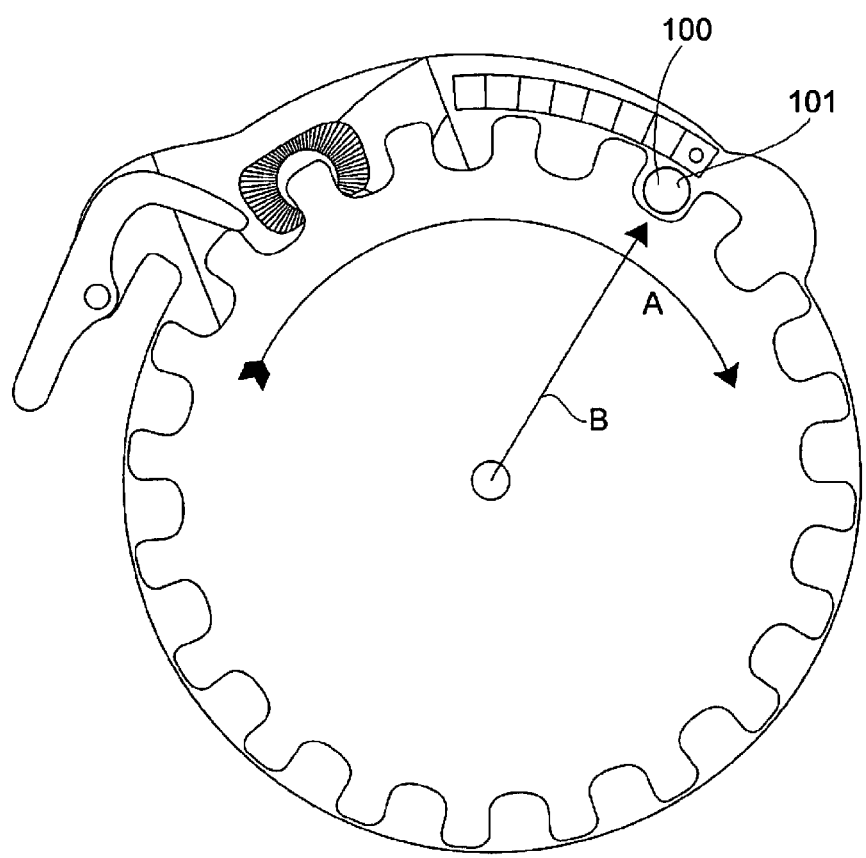
Figure 8A:
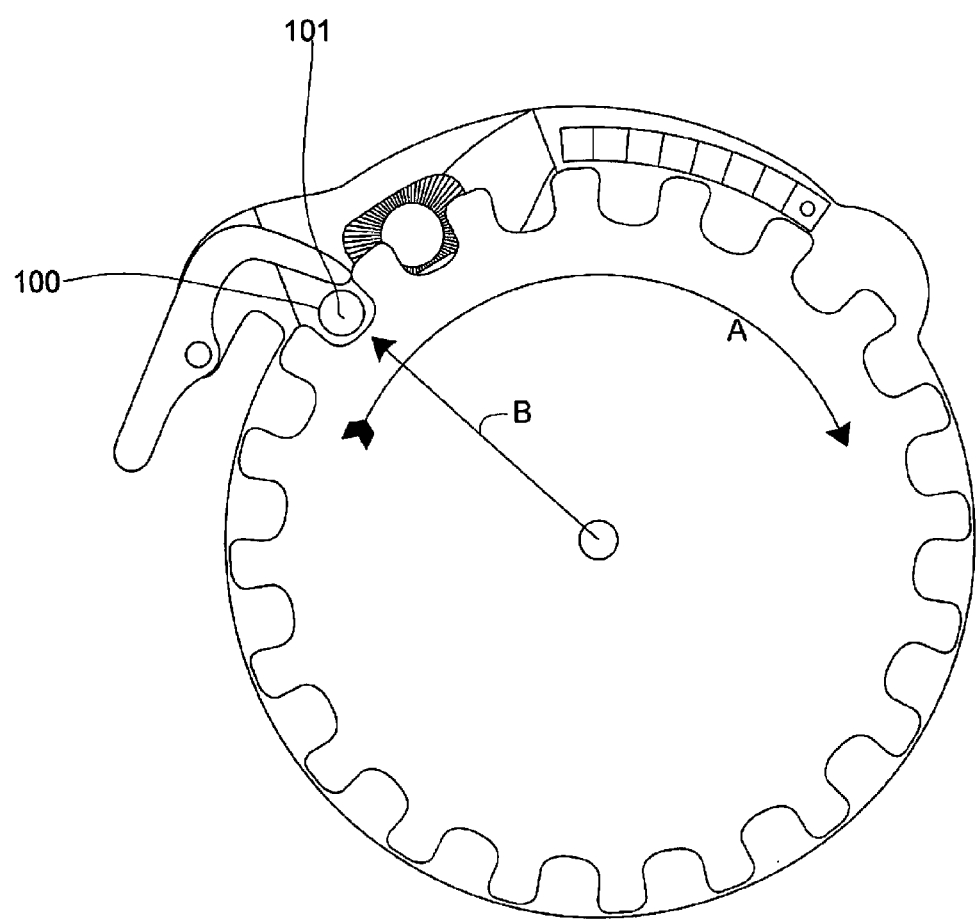
Figure 8B:
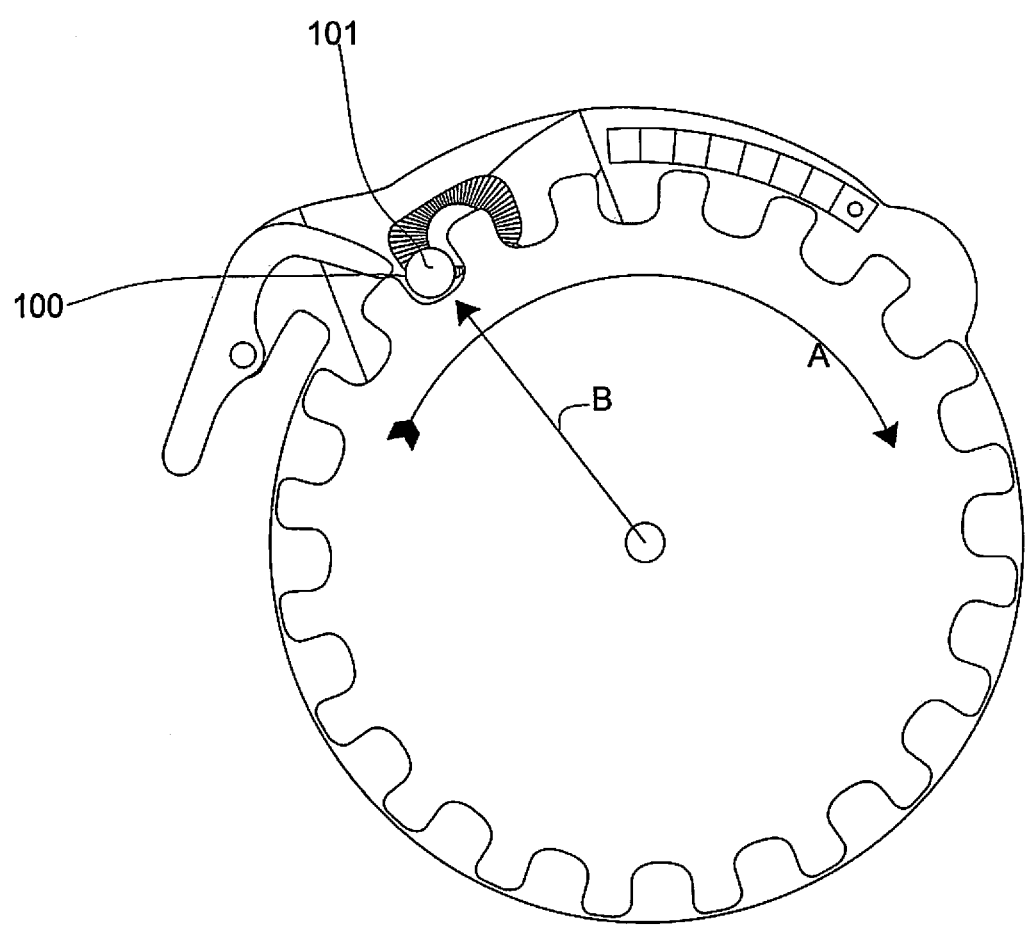
Figure 8C:
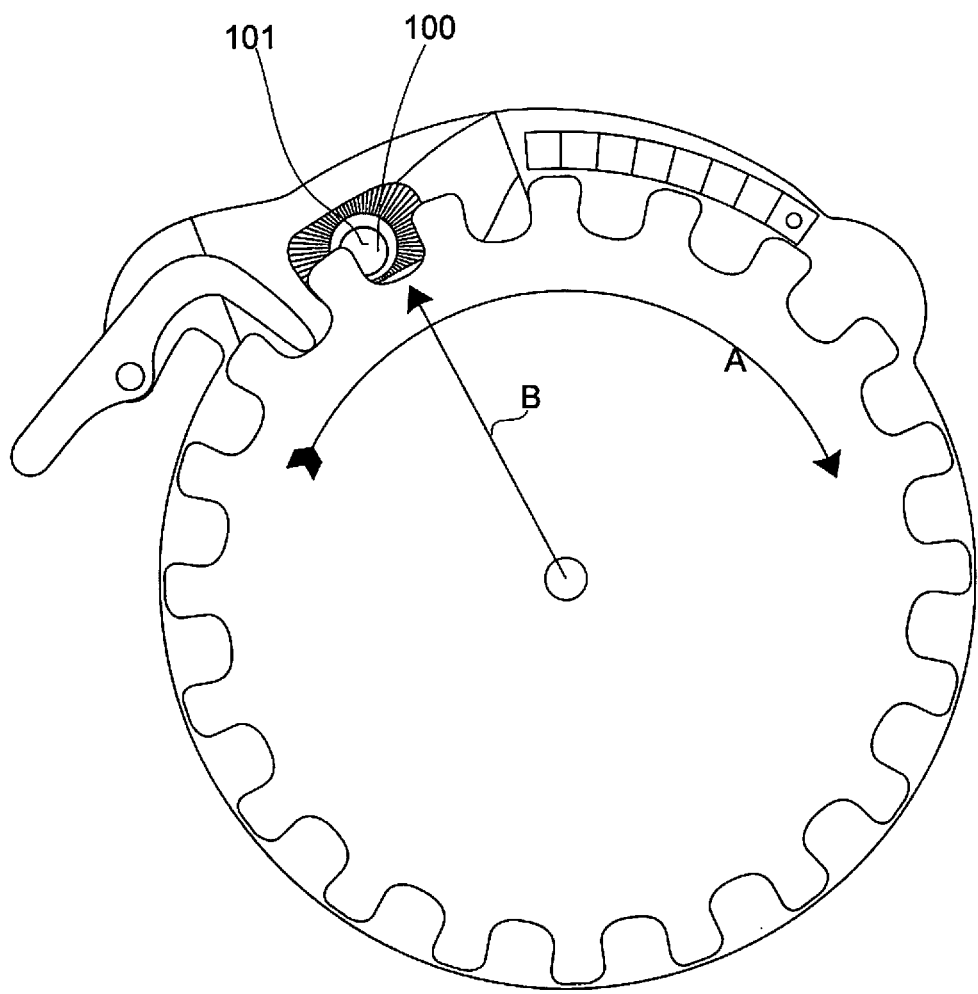
Figure 8D:
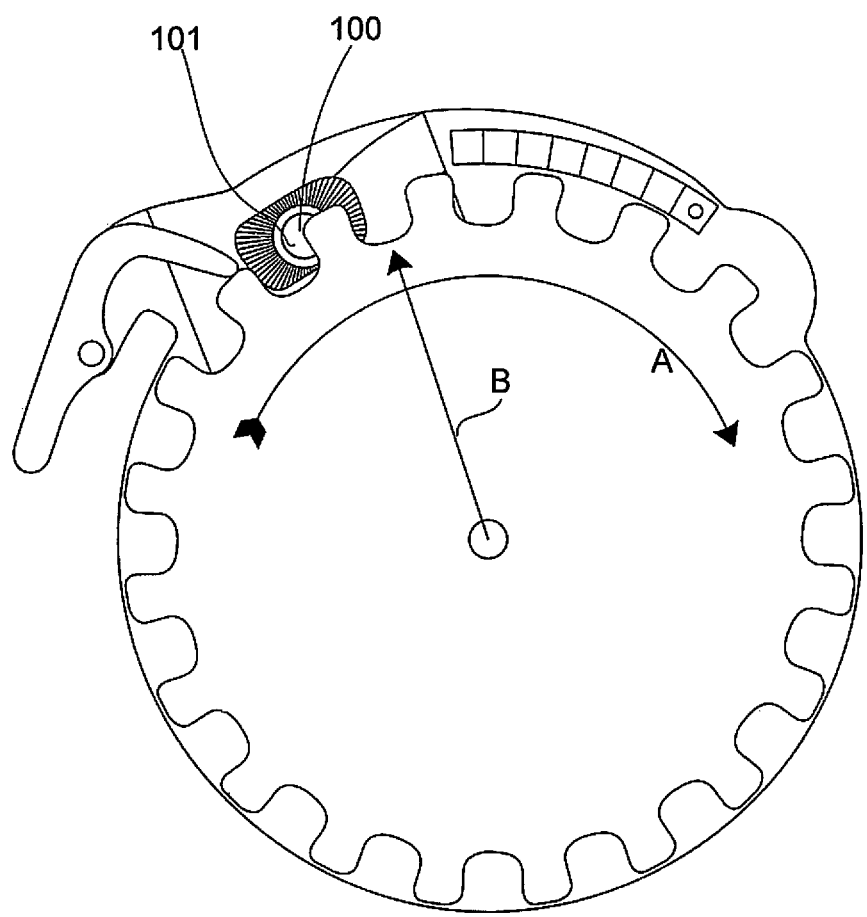

Rotary hopper 21 is the preferred bullet conveyance for conveying bullets 100 along a bullet conveyance path to exit tube 23. Alternatively, other conveyances can be used such as a linear conveyance system, which would be apparent to someone skilled in the art. Hopper 21 applies bullets 100 to exit tube 23 from a source of bullets 100 maintained by hopper 21 as seen in FIG. 1. Bullets 100 each have a base-end 101 and an opposed tip-end 102 as seen in FIG. 2. Rotary hopper 21 conveys bullets 100, in tip-end-down and tip-end-up positions or orientations, from the source of bullets 100 to exit tube 23 along a bullet conveyance path denoted in FIGS. 3 and 5 by arcuate arrowed line X. A bullet-orienting structure 80 denoted in FIGS. 4-6 is disposed proximate bullet conveyance path X. For each tip-end-up bullet 100, namely, for each bullet 100 disposed in the tip-end-up orientation, a block 70 and bullet-orienting structure 80 interacts with the tip-end-up bullet 100 and flips the tip-end-up bullet 100 relative to the bullet conveyance, i.e., rotary hopper 21, from the tip-end-up orientation to the tip-end-down orientation prior to application to exit tube 23.

Looking to FIGS. 1 and 2, rotary hopper 21 includes an upstanding sidewall 30 having an outer surface 31, an inner surface 32, a lower edge 33 and an opposing upper edge 34. Hopper 21 further includes a substantially perpendicular bottom 35 relative to and integral with or affixed to inner surface 32. Bottom 35 has an upper surface 35A and an opposing lower surface 35B. Upper surface 35A of bottom 35 cooperates with inner surface 32 of sidewall 30 to substantially bound a bullet-receiving chamber 36. Sidewall 30 can be entirely continuous or it can include a window or gap or other opening. Upper edge 34 defines an opening leading into chamber 36. Hopper 21 is constructed of a rigid material, such as plastic, metal, wood, or the like. Upper edge 34 bounds an opening 34A into chamber 36.

As seen in FIG. 1, hopper 21 is carried by an upstanding base 40, which supports hopper 21 at an elevated location relative to bullet receiving apparatus 22 and in a tilted attitude. Because hopper 21 is supported in a tilted state, hopper 21 has a down-angled side designated generally at 21A and an up-angled side designated generally at 21B. Base 40 is fashioned of a rigid material such plastic, wood, metal, or the like, and consists of an upstanding, elongate housing 41, having a lower end 42 positioned against a support surface 43, and extends upright therefrom to an upper end 44 onto which hopper 21 is mounted. Base 40 can take any desired shape or form and can further house control elements or other components.

Rotary hopper 21 further comprises a collator plate or bullet conveyance wheel 46 located in chamber 34 and positioned atop upper surface 35A of bottom 35. A bracket 50 is secured to housing 41, such as with screws, bolts or the like, adjacent to upper end 44 of base 40, and is spaced from, and underlies, lower surface 35B of bottom 35. A rotary motor 51 is affixed to bracket 50, such as with screws, bolts, etc. Bracket 50 supports rotary motor 51. Alternatively, rotary motor 51 can be affixed to hopper 21 by other means, as will be known to someone skilled in the art. Rotary motor 51 is positioned beneath and opposes lower surface 35B of bottom 35 and is operatively coupled to wheel 46 with a drive shaft 52 coupled between rotary motor 51 and wheel 46. Drive shaft 52 extends through bottom 35 of hopper 21 from rotary motor 51 to wheel 46, and is rigidly and permanently or removably attached to wheel 46 thereby operatively coupling rotary motor 51 to wheel 46. Upon actuation of rotary motor 51, rotary motor 51 imparts rotation to wheel 46 via drive shaft 52 rotating wheel 46 in a clockwise direction as generally indicated by the arcuate arrowed line A in FIG. 3. Although drive shaft 52 is used to operatively couple rotary motor 52 to wheel 46, other power transfer mechanisms can be used, such as a drive gear assembly, a belt drive assembly, etc.

Figure 3:
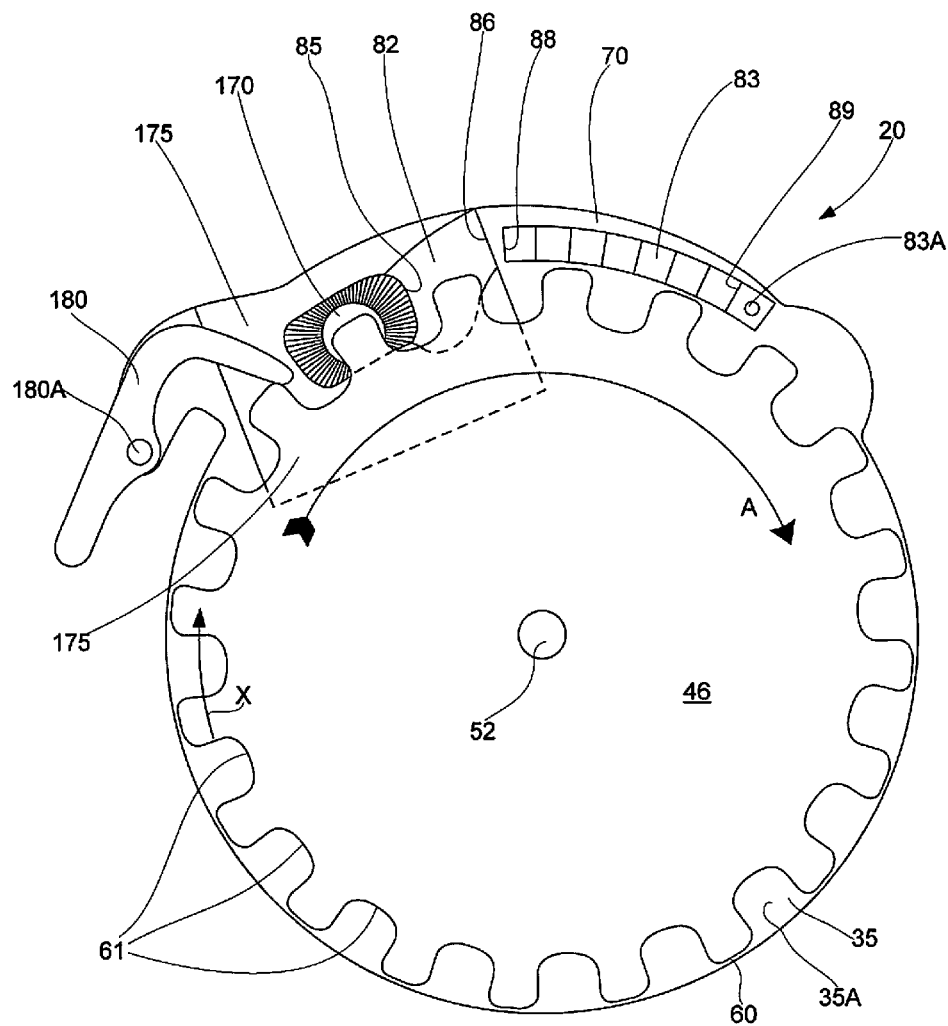
FIG. 3 is a top plan view of a rotary wheel, block, and bullet-orienting structure of the bullet dispensing system of the present invention.

Looking now to FIG. 3, wheel 46 is a large, flat, circular, integrated disk which is substantially coextensive relative to bottom 32, and includes a perimeter edge 60 directed toward sidewall 30 of hopper 21 as seen in FIG. 1. Bullet-receiving notches 61 are formed around perimeter edge 60 of wheel 46, and preferably are formed at substantially equally-spaced apart intervals along the entire length of perimeter edge 60. Alternatively, notches 61 can be spaced according to other patterns to account for additional design features of wheel 46 or to accommodate fasteners. Notches 61 are preferably sized to accommodate the circumference of a variety of bullets. Wheel 46 can further optionally include agitator grooves 185 to encourage the bullets to jostle or move as wheel 46 rotates and indentations 186 adjacent notches 61 to encourage bullets to fall into notches 61, both of which are illustrated in FIG. 6. Wheel 46 is fashioned of a rigid material such plastic, wood, metal, or the like.

Referring to FIGS. 1-3, hopper 21 is fashioned with a bullet-orienting block 70 and bullet-orienting structure, which is located at up-angled end 21B, and which is used to ensure that bullets are conveyed to exit tube 23 in the correct orientation, namely, the tip-end-down orientation. Block 70 is affixed to hopper 21 at bottom 35 as best illustrated in FIGS. 1-3 and 5. In this preferred embodiment, block 70 projects radially outward from bottom 35 and perimeter edge 60 of wheel 46 through a window 37 formed in sidewall 30 proximate closed bottom 32. As seen in FIGS. 2-6, block 70 is an integrated body formed of a rigid material such as plastic, metal, or the like, and includes an inner end 71 affixed to bottom 35 and an opposed outer end 72 extending outwardly therefrom, an upstream end 73 and an opposing downstream end 74, an upper surface 75 and an opposing lower surface 76.

Referring to FIGS. 3-6, block 70 is formed with bullet-orienting structure 80 disposed proximate bullet conveyance path X. Bullet-orienting structure 80 can be formed in upper surface 75 of block 70. Alternatively and preferably, bullet-orienting structure is composed of separate components attached together with fasteners to allow for maximum adjustability as shown in FIGS. 4-6. Bullet-orienting structure 80 comprises a ramp 83, a nose plate 175, and an upper surface or stage 81 on nose plate 175 formed with a groove 82 and a tapered opening 170. Upper surface or stage 81 additionally or alternatively can be the upper surface of block 70. Stage 81 is generally level relative to upper surface 35A of bottom 35, and essentially constitutes an extension of upper surface 35A of bottom 35.

In the preferred embodiment, tapered opening 170 extends through nose plate 175 from stage 81 and cooperates with exit tube 23 either directly or with a nozzle 90 or other fitting as shown in detail in FIG. 4B. Nose plate 175 is positioned within block 70, as shown, such that nose plate 175 also extends through block 70. Alternatively, tapered opening 170 can extend through block 70, groove 82 can be formed in an upper surface of block 70, and nose plate 175 can comprise a thin plate that rests upon block 70 to cooperate with tapered opening 170 and groove 82. Optionally, the amount of taper or slope on the sides of tapered opening 170 can vary to facilitate receiving bullets without causing the received bullets to become lodged in tapered opening 170. For example, a steeper slope or taper is encountered along the side of tapered opening 170 that is proximate end 71 of block 70, as shown in FIG. 4B.

Groove 82 formed in stage 81 is oblique relative perimeter edge 60 of wheel 46. Groove 82 has an inner end 85 directed toward perimeter edge 60 of wheel 46 and upstream end 73 of block 70 at inner end 71 of block 70, and extends outwardly therefrom in an oblique angle relative to perimeter 60 of wheel 46 to an outer end 86 directed toward outer end 72 and downstream end 74 of block. Groove 82 has a width W as designated in FIG. 7, which decreases from inner end 85 to outer end 86. Groove 82 has a depth that allows a bullet base to move outward consistently yet does not cause the whole bullet to leave notch 61, which could cause wheel 46 to jam. A depth between 3/16 inches and 1/4 inches is preferred, although smaller and larger depths are acceptable depending on the size of the bullet and the bullet's center of gravity.

Nose plate 175 is preferably an adjustable component removably secured to block 70 with a screw or other type of fastener. Preferably it is attached so that it can translate radially relative to wheel 46. Alternatively, it is attached so that it can pivot about its attachment point. Stage 81 is formed by the top surface of nose plate 175 and includes groove 82 and tapered opening 170. Around tapered opening 170 and groove 82, an irregular edge is formed that includes a ledge 176, and a nose plate notch 177. Nose plate further extends under wheel 46. Ledge 176 is oriented such that it forms a slight protrusion on which a base-end 101 of a tip-end-up oriented bullet rests at the location of tapered opening 170. Ledge 176 is further positioned such that it fails to support a tip-end-down oriented bullet therefore allowing the tip-end-down oriented bullet to fall tip-end 102 first into tapered opening 170. Nose plate notch 177 is oriented such that it cooperates with groove 82 and permits the base-end 101 of a tip-end-up oriented bullet to fall into groove 82 when passing above groove 82.

Ramp 83 has a lower end 88 located near or adjacent nose plate 175 and outer end 86 of groove 82 and ramps upwardly therefrom toward downstream end 74 of block 70 to an upper end 89 at upper surface 75 of block 70. Ramp 83 can abut groove 82 or can be spaced from outer end 86 of groove 82 a small amount, which may be variable according to adjustments in the position of ramp 83. Ramp 83 cooperates with a bullet travelling along ramp 83 such that the bullet is rotated from a tip-end-up orientation to a tip-end-down orientation as it is pushed along ramp 83. Ramp 83 can have a smooth top surface or it can be rough, grooved, serrated, or stepped. Ramp 83 can be integral with block 70 or it can be a separate component fixed thereto. Preferably, ramp 83 is a separate component pivotally secured to block 70 to facilitate adjustability. For example, FIGS. 4-6 show ramp 83 attached to block 70 with a screw 83A and nut 83B arrangement.

Referring to FIGS. 2, 4B, and 6, nozzle 90 is applied to nose plate 175 at tapered opening 170, and is secured in place with a locking element, which in this instance is a set screw (not shown) although any suitable locking element or engagement can be used between nozzle 90 and tapered opening 170 without departing from the invention. Nozzle 90, which is considered part of block 70, can be removed by loosening set screw, removing nozzle 90, applying a new nozzle at tapered opening 170, and then securing the newly applied nozzle in place at tapered opening 170 by tightening set screw. The ability to replace nozzle 90 with a different nozzle allows nozzle 90 to be replaced if damaged or worn, and to be replaced with differently sized nozzles for accommodating differently-sized bullets. Nozzle 90 may be screwed to nose plate 175, pinned to nose plate 175, or attached to nose plate 175 in other ways. Nozzle 90 may be integrally formed with nose plate 175, if desired. In an alternative embodiment, where tapered opening 170 extends through block 70, nozzle 90 may be similarly secured to block 70.

Optionally and preferably, a bullet rejecting apparatus reject bullets only partially received in notches 61. The preferred embodiment of bullet rejecting apparatus is shown in FIGS. 4-7I. As shown, bullet rejecting apparatus is a spring loaded pivoting arm 180 biased toward wheel 46. Pivoting arm 180, as shown, pivots around a fastener 180A that secures arm 180 to block 70. Arm 180 is further positioned so its tip 180B rests against the perimeter edge 60 of wheel 46 immediately before a bullet would encounter tapered opening 170 and bullet-orienting structure 180. Preferably, the position of arm 180 is adjustable both radially and in a direction parallel to the circumference of wheel 46. When a bullet 100 in notch 61 encounters bullet rejecting arm, the arm applies pressure to bullet 100 in a generally radially inward toward the center of wheel 46. If bullet 100 is only partially seated in notch 61, then the pressure from arm 180 causes bullet 100 to eject from the notch before encountering the bullet-orienting structure. If bullet 100 is correctly seated in notch 61 in either a tip-end-up orientation or tip-end-down orientation, then the bullet is not ejected by arm 180 and continues on to either drop into tapered opening 170 or to be flipped 180 degrees by the bullet-orientating structure 80. Alternative bullet rejection structures are contemplated as well. For specific details of an alternative bullet rejecting apparatus, see FIGS. 15-17 and columns 15-16 of U.S. Pat. No. 7,497,155 issued to Richard Koskela, the disclosure of which is incorporated herein.

As previously mentioned, rotary hopper 21 conveys bullets to exit tube 23 along bullet conveyance path X, which in turn conveys the bullets to bullet receiving apparatus 22. In operation, and with reference to FIG. 1, a charge or source of bullets 100 is placed onto wheel 46 in chamber 36 through opening 34A, and rotary motor 51 is activated imparting rotation to wheel 46. As wheel 46 rotates in a clockwise direction as indicated by the arcuate arrowed line A in FIGS. 3 and 6-8D, bullets 100 are displaced and tumbled through the rotation of wheel 46 and fall into notches 61 at down-angled end 21A of hopper 21 against upper surface 35A of bottom 35. Bullets 100 then are conveyed across upper surface 35A of bottom 35 along bullet conveyance path X upwardly to block 70 at up-angled end 21B of hopper 21. Wheel 46 applies bullets 100 in notches 61 to block 70 from upstream end 73 to downstream end 74.

Figure 10:
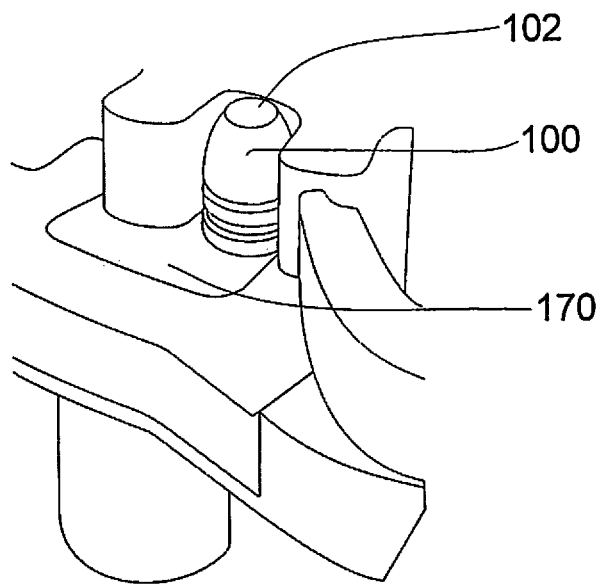
FIG. 10 is a fragmented side perspective view of a tip-end-up oriented bullet passing over the tapered opening of the present invention.
Figure 11:
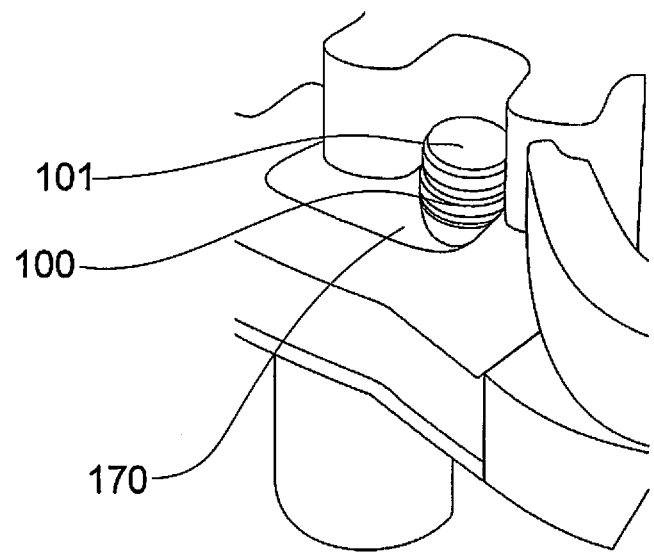
FIG. 11 is a fragmented side perspective view of a tip-end-down oriented bullet falling into the tapered opening of the present invention.

Bullets 100 conveyed to exit tube 23 along the bullet conveyance path X must enter upper end 23A of exit tube 23 with the tip-end 102 downwardly oriented to cooperate with bullet receiving apparatus 22. As wheel 46 rotates, some of the bullets 100 fall into notches 61 tip-end-down, and others fall into notches 61 base-end-down. A bullet 100 that falls into a notch 61 with its tip-end 102 downwardly oriented is properly oriented, and a bullet 100 that falls into a notch 61 with its base-end 101 downwardly oriented is improperly oriented and is flipped 180 degrees into the proper tip-end-down orientation by the provision of block 70 and bullet-orienting structure 80. As wheel 46 applies bullets 100 in notches 61 to block 70 from upstream end 73 to downstream end 74 along bullet conveyance path X, the bullets 100 in the proper tipend-down orientation are immediately passed to exit tube 23 by falling off ledge 176 formed by nose plate 175 and through tapered opening 170, as shown in detail in FIG. 11. Bullets 100 that are in the improper base-end-down position bypass tapered opening 170 by riding across ledge 176 of nose plate 175, as shown in detail in FIG. 10. Base-end-down, or tip-end-up, bullets then fall into groove 82 and are directed to ramp 83 as wheel 46 rotates. Ramp 83 then flips the base-end-down bullets 180 degrees so that they are reoriented in notches 61 in the proper tip-end-down orientation. After the wheel rotates nearly 360 degrees, the now properly-oriented bullets 100 pass to exit tube 23 through tapered opening 170.

FIGS. 7A-7I and 8A-8D illustrate a bullet 100 in successive positions as conveyed by wheel 46 along block 70 at bullet conveyance path X. Bullets 100 are each identical in size and shape, and include, as referenced in FIG. 3, base-end 101, which is broad and flat, and opposing tip-end 102 which is narrowed and at least somewhat pointed, tapered, or conical. The width of base-end 101 of each bullet 100 is somewhat smaller than width W of groove 82, according to the principle of the invention. FIGS. 7A-7I illustrate how a bullet oriented with its tip-end facing up is flipped by the bullet-orienting structure to become a bullet oriented with its tip-end facing down. FIGS. 8A-8D illustrate how a bullet oriented with its base-end facing up and tip-end facing down is dropped through tapered opening 170. The sequence is further described below.

As shown in FIGS. 7A-7I, a bullet 100 is in notch 61 tip-end-up, which is an improper bullet orientation. As wheel 46 rotates, it conveys bullet 100 along block 70 from upstream end 73 to downstream end 74. Because bullet 100 is prevented from falling into tapered opening 170 by ledge 176 of nose plate 175, it is drawn along block 70 and further interacts with bullet-orienting structure 80 of block 70. Bullet 100 is rotated 180 degrees from the improper tip-end-up orientation to the proper tip-end-down orientation, in accordance with the principle of the invention.

In particular, as wheel 46 rotates, bullet 100 is conveyed from the first position toward a second position to nose plate 175 at tapered opening 170. From there, bullet 100 is conveyed to inner end 85 of groove 82 at stage 81. Nose plate notch 175 directs bullet 100 to fall with its base-end 101 into groove 82 at inner end 85. Base end 101 of bullet 100 is then displaced outwardly away from perimeter 60 of wheel 46. As wheel 46 continues to rotate, the application or interaction of base-end 101 with groove 82 draws base-end 101 outwardly along groove 82 to its outer end 86. Wheel 46 continues to rotate and draw bullet 100 past outer end 86 of groove 82 and to lower end 88 of ramp 83. Base-end 101 is drawn upwardly along ramp 83 as wheel 46 continues to rotate. The continued rotation of wheel 46 then draws bullet 100 further along ramp 83, which rotates bullet 100 into the proper tip-end-down orientation. Bullet 100 is then rotated with wheel 46 back to the upstream end 73 of block 70 so that it can fall into tapered opening 170 and exit tube 23. This process is repeated for each bullet 100 that is applied to block 70 in the improper tip-end-up orientation.

Because the base-end 101 of each bullet 100 is flat, it can rest upon ledge 176 of nose plate 175 when it passes by tapered opening 170. Hopper 21 is preferably angled enough to allow gravity to encourage a tip-end-up bullet to travel with its base-end resting on ledge 176 but to permit a tip-end-down bullet to fall off ledge 176 and into tapered opening 170. Accordingly, when a bullet is applied to block 70 in the proper tip-down orientation, the bullet 100 falls into tapered opening 170 and exit tube 23, as shown in FIGS. 8A-8D. When a bullet is applied to block 70 in the improper tip-up orientation, the bullet is rotated by the bullet-orienting structure 80.

The provision of block 70 ensures that all bullets applied to upper end 23A of exit tube 23 are applied in the proper tip-end-down orientation, which ensures that bullets are applied tip-end 102 first into the awaiting bullet receiving apparatus. Block 70 is easy to construct, and may be incorporated with any suitable rotary hopper 21. In this regard, it is to be understood that, with the exception of block 70, hopper 21 is generally representative of a conventional rotary hopper. Furthermore, although floor-mounted base 40 is used to support hopper 21 at an elevated location relative to bullet receiving apparatus 22 for allowing bullets applied to upper end 23A of exit tube 23 to be gravity feed to lower end 23B of exit tube 23 coupled to bullet receiving apparatus 22, hopper 21 can be table-mounted, wall-mounted, or otherwise suspended in place in any desired manner.

In the present embodiment, wheel 46 applies bullets 100 to block 70 from upstream end 73 to downstream end 74 through clockwise rotation. If desired, wheel 46 can apply bullets 100 to block 70 from downstream end 74 to upstream end 73 through counterclockwise rotation simply by reversing structure 80 of block 70. For example, tapered opening 170 and ledge 176 of noseplate 175 would be located proximate downstream end 74. Groove 82 and notch 177 of noseplate 175 would then be proximate tapered opening 170. Ramp 83 would be proximate groove 82.

Figure 9:
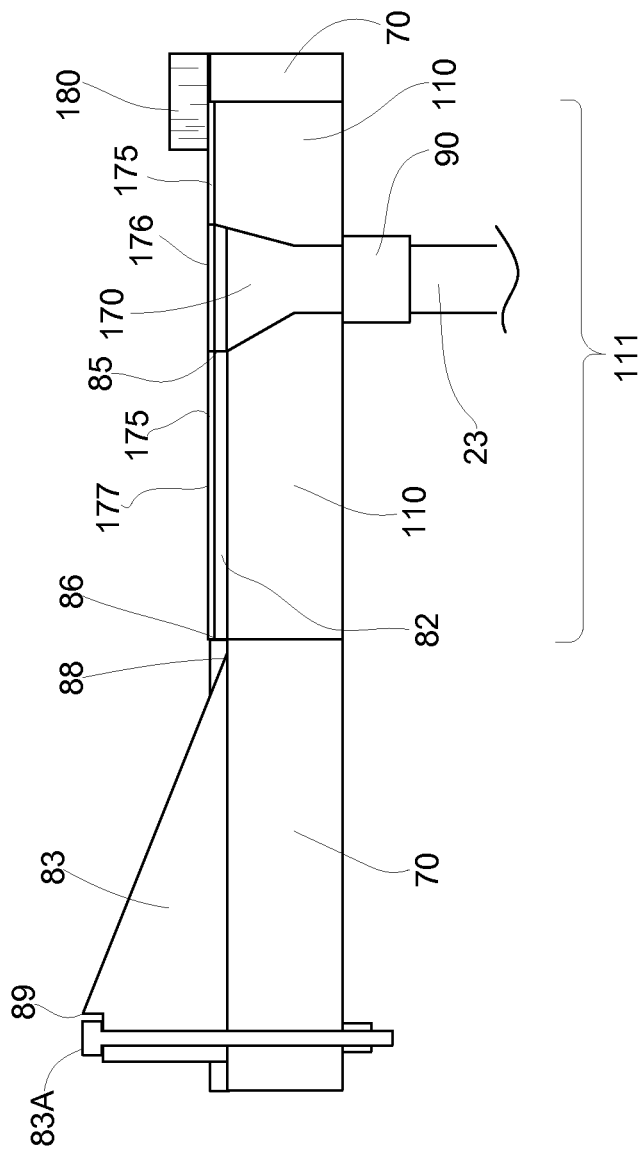
FIG. 9 is an alternative embodiment of the block and bullet-orienting structure of the present invention.

An alternative embodiment, as shown in FIG. 9, for the block and nose plate further comprises a plug 110 applied to an opening 111 formed block 70 proximate upstream end 73, which is secured in place with any suitable locking element or engagement, as is known in the art. In this embodiment, groove 82 and tapered opening 170 are formed in plug 110, and plug 110 can be removed and replaced. In this embodiment, nose plate 175 comprises a thin plate that rests on plug 110 and defines ledge 176 and nose plate notch 177. The ability to replace plug 110 with a different plug allows plug 110 to be replaced if damaged or worn, and to be replaced with different plugs having grooves of varying widths for allowing hopper 21 to be used with differently-sized bullets. Additionally, with this embodiment, nose plate 175 can easily be replaced for repairs or to accommodate differently-sized bullets as well.

In the present embodiment, block 70 is affixed to bottom 35 of hopper 21. Consistent with the teachings relating to the bullet-orienting structure 80 of block 70, block 70 can be attached to hopper 21 at other locations, such as to sidewall 30. Furthermore, bullet-orienting structure 80 may, if desired, be formed in sidewall 30.

Rotary motor can include a switch for manually turning it on or off. Alternately, it can cooperate with a switching mechanism along exit tube 23 that operates motor 23 according to the absence or presence of bullets in the exit tube. A switch useful for this application is described in U.S. Pat. Nos. 7,497,155 and 7,549,364, both issued to Richard Koskela, the disclosures of which are incorporated herein.

While there has been illustrated and described what is at present considered to be the preferred embodiment of the present invention, it will be understood by those skilled in the art that various changes and modifications may be made and equivalents may be substituted for elements thereof without departing from the true scope of the invention disclosed, but that the invention will include all embodiments falling within the scope of the claims.

I claim:

1. A bullet-orienting apparatus for orienting bullets comprising a tip-end and a base-end, the apparatus comprising:
   a. a bullet conveyance comprising a wheel having a perimeter defining one or more notches wherein each notch is sized to accommodate a bullet resting with either its tip-end or its base-end facing a nose plate when the notch is positioned above the nose plate; and
   b. a bullet-orienting structure positioned adjacent the bullet conveyance such that a bullet conveyed from an upstream location to a downstream location by the bullet conveyance interacts with the bullet-orienting structure, wherein the bullet-orienting structure comprises:
      i. the nose plate that extends at least partially below the wheel, wherein the nose plate defines a tapered opening and a groove having a first end and a second end, wherein the first end of the groove is disposed adjacent to the tapered opening and wherein the tapered opening is positioned such that it is partially extends beneath the perimeter of the wheel and such that a bullet positioned in a notch of the wheel and oriented with its tip-end facing toward the tapered opening would fall into the tapered opening and such that a bullet positioned in a notch of the wheel and oriented with its base-end facing toward the tapered opening would not fall into the tapered opening; and
      iii. a ramp having a first end and a second end, wherein the first end of the ramp is disposed adjacent to the second end of the groove, wherein the ramp is positioned downstream from the tapered opening, and wherein a bullet positioned in a notch with its base-end facing toward the tapered opening would interact with the ramp.

2. The bullet-orienting apparatus of claim 1 wherein the bullet conveyance further comprises a motor operably connected to the wheel such that when the motor is operating the wheel rotates.

3. The bullet-orienting apparatus of claim 1 wherein the bullet-orienting structure further comprises a block positioned adjacent the wheel and wherein the nose plate is removably secured to the block.

4. The bullet-orienting apparatus of claim 3 wherein the ramp is removably secured to the block.

5. The bullet-orienting apparatus of claim 3 wherein the ramp is integral with the block.

6. The bullet-orienting apparatus of claim 1 wherein the groove defined by the nose plate is irregular in shape and is positioned such that it partially extends beneath the perimeter of the wheel and such that a bullet positioned in a notch of the wheel would fall into the groove.

7. The bullet-orienting apparatus of claim 6 wherein the groove is oblique relative to the perimeter of the wheel.

8. The bullet-orienting apparatus of claim 7 wherein the groove is wider at its first end than at its second end.

9. The bullet-orienting apparatus of claim 1 wherein the tapered opening comprises varying degrees of taper.

10. The bullet-orienting apparatus of claim 1 further comprising a bullet rejecting apparatus.

11. The bullet-orienting apparatus of claim 10 wherein the bullet rejecting apparatus comprises an arm having a tip, wherein the tip of the arm is biased by a spring toward the perimeter of the wheel.

12. The bullet-orienting apparatus of claim 1 further comprising a hopper in which the bullet conveyance is housed.

13. The bullet-orienting apparatus of claim 12 wherein the hopper comprises a sidewall defining a window, wherein the bullet-orienting structure is positioned adjacent the bullet conveyance at the location of the window in the hopper sidewall.

14. The bullet-orienting apparatus of claim 1 further comprising an exit tube in fluid communication with the tapered opening of the noseplate.

15. The bullet-orienting apparatus of claim 1 further comprising a nozzle removably attached to the nose plate such that the nozzle and tapered opening are in fluid communication.

16. A bullet-orienting apparatus for orienting bullets comprising a tip-end and a base-end, the apparatus comprising:
   a. a hopper comprising a sidewall connected to a bottom, wherein the sidewall defines a window;
   b. a wheel rotatably attached to the bottom of the hopper, wherein the wheel comprises a perimeter defining one or more notches and wherein the notches are sized to accommodate a bullet resting with either its tip-end or its base-end facing the bottom of the hopper;
   c. a rotary motor operably connected to the wheel; and
   d. a bullet-orienting structure positioned adjacent the wheel at the location of the window in the sidewall of the hopper such that a bullet conveyed from an upstream location to a downstream location by the wheel interacts with the bullet-orienting structure, wherein the bullet-orienting structure comprises:
      i. a nose plate that extends at least partially below the wheel, wherein the nose plate defines a tapered opening and a groove having a first end and a second end, wherein the first end of the groove is disposed adjacent to the tapered opening and wherein the tapered opening is positioned such that it is partially extends beneath the perimeter of the wheel and such that a bullet positioned in a notch of the wheel and oriented with its tip-end facing toward the tapered opening would fall into the tapered opening and such that a bullet positioned in a notch of the wheel and oriented with its base-end facing toward the tapered opening would not fall into the tapered opening; and
      iii. a ramp having a first end and a second end, wherein the first end of the ramp is disposed adjacent to the second end of the groove, wherein the ramp is positioned downstream from the tapered opening, and wherein a bullet positioned in a notch with its base-end facing toward the tapered opening would interact with the ramp.

17. The bullet-orienting apparatus of claim 16 wherein the bullet-orienting structure further comprises a block positioned through the window of the hopper and adjacent the wheel and wherein the nose plate is removably secured to the block.

18. The bullet-orienting apparatus of claim 16 wherein the groove defined by the nose plate is irregular in shape and is positioned such that it partially extends beneath the perimeter of the wheel and such that a bullet positioned in a notch of the wheel would fall into the groove.

* * * * *